UNITED STATES PATENT OFFICE.

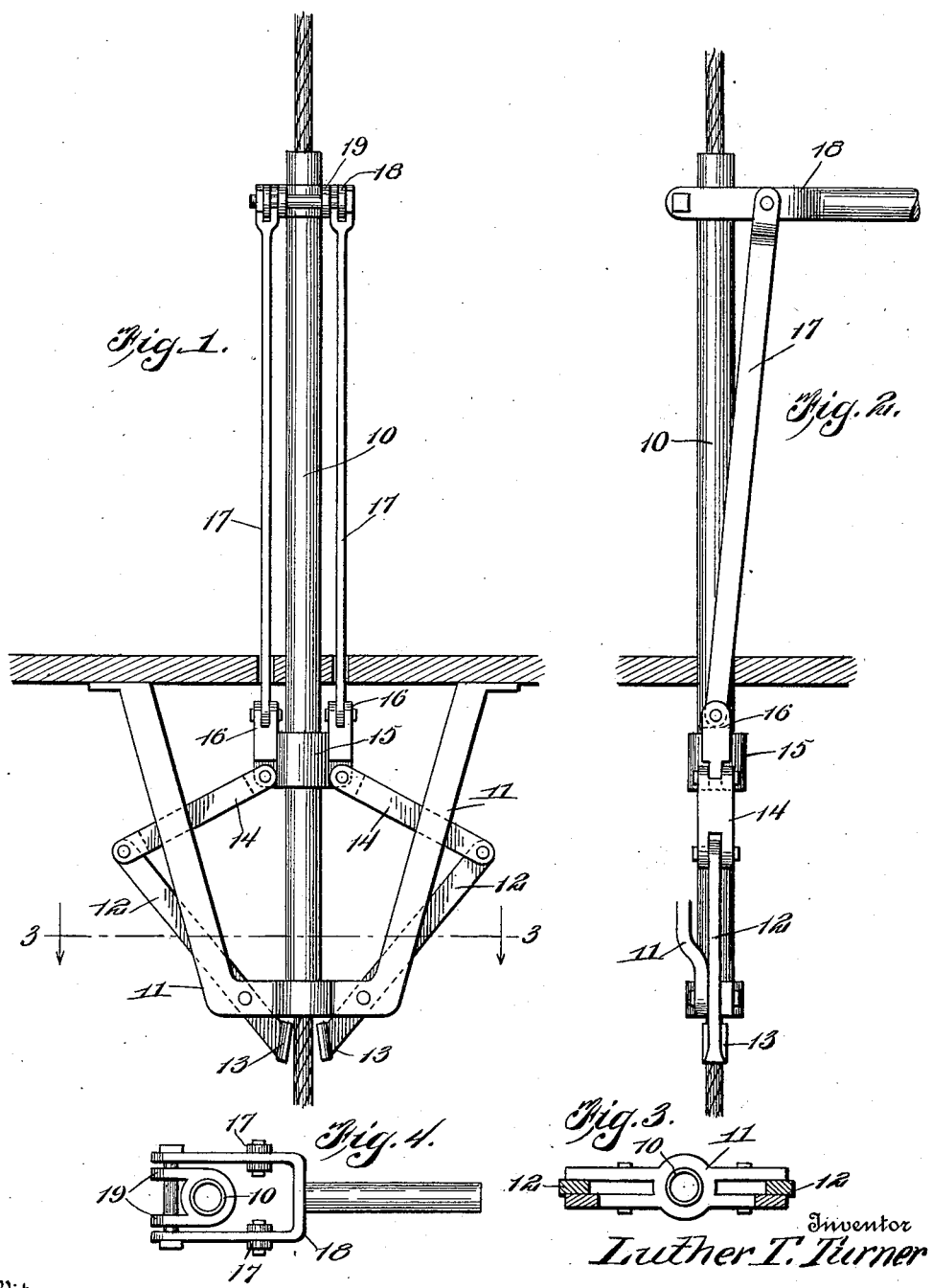

LUTHER T. TURNER, OF ARTESIA, NEW MEXICO.

BRAKE-CLUTCH.

1,018,280. Specification of Letters Patent. Patented Feb. 20, 1912.

Application filed September 13, 1911. Serial No. 649,021.

*To all whom it may concern:*

Be it known that I, LUTHER T. TURNER, a citizen of the United States, residing at Artesia, in the county of Eddy and State of New Mexico, have invented new and useful Improvements in Brake-Clutches, of which the following is a specification.

An object of the invention is to provide a clutch, particularly adapted for use in connection with elevators for applying a brake on the cable of the elevator to stop the elevator car.

My device is particularly adaptable for use in connection with elevators in which the operating cable passes through the car and in which the operator can by a slight movement, operate the clutch to grip the cable and stop the car.

For the purpose mentioned, use is made of a tubular casing adapted to be mounted within the car and through which the cable is passed, brake shoes mounted adjacent the lower end of the said casing and adapted to grip the cable and means within the car for operating the said brake shoes.

Reference is to be had to the accompanying drawings constituting a part of this specification, in which similar characters of reference denote corresponding parts in all the views, and in which—

Figure 1 is a front elevation of the device, a cable being shown passed through the casing. Fig. 2 is a side elevation. Fig. 3 is a vertical longitudinal sectional view taken on the line 3—3 in Fig. 1. Fig. 4 is a top plan view.

Referring more particularly to the views, I provide a tubular casing 10 which is adapted to be mounted within an elevator car, the said casing having the operating cable passed therethrough with the lower end of the casing extended beneath the floor of the elevator car. A bracket 11 is secured to the car adjacent the lower end of the casing 10 and mounted to swing on the bracket 11 are a plurality of brake levers 12 provided with brake shoes 13. Pivotally connected to the brake levers 12 are operating arms 14 pivotally connected to a sliding member 15 mounted to encircle the casing 10 and slidable thereon. Rigidly secured to the slid- ing member 15 are forked bearings 16 having pivotally mounted therein a plurality of forked rods 17 pivotally connected to an operating lever 18, mounted to partially encircle the casing 10 and mounted to swing on a projection 19 of the casing 10.

The brake shoes 13 are mounted beneath the lower end of the casing 10 and as the operating cable is extended through the casing, when it is desired to stop the car the operating lever 18 is pressed downwardly, thus moving the brake shoes 13 into gripping engagement with the cable. To release the brake shoes 13 from gripping engagement with the cable, the operating lever 18 is moved upwardly, thus disengaging the brake shoes from the cable through the medium of the brake levers 12, the arms 14 and the rods 17 connected to the sliding member 15 and the operating lever 18.

If desirable suitable rollers can be mounted on the sliding member 15, the said rollers being pivotally connected to the arms 14 and adapted to operate over the outer surface of the tubular casing 10. It will be understood that although for the purpose of describing my device I have shown a particular form thereof, the scope of the invention is defined in the appended claim.

Having thus fully described the invention, what I claim as new, is:—

In a device of the class described, a tubular casing, brake shoes mounted adjacent the lower end of the said casing, brake levers connected with the said brake shoes for operating the same, a sliding member mounted to encircle the said casing and slidable thereon, arms connecting the said brake levers with the said sliding member, bearings secured to the said sliding member, an operating lever and rods connecting the said operating lever with the said bearings for actuating the said brake shoes when the said operating lever is actuated.

In testimony whereof I affix my signature in presence of two witnesses.

LUTHER T. TURNER.

Witnesses:
T. B. LARRABEE,
E. A. BEEMAN.

Copies of this patent may be obtained for five cents each, by addressing the "Commissioner of Patents, Washington, D. C."